(12) United States Patent
Lister et al.

(10) Patent No.: US 12,504,069 B2
(45) Date of Patent: Dec. 23, 2025

(54) GEAR SHIFTING PROCESS FOR POWERTRAIN TRANSMISSION

(71) Applicant: Caterpillar Inc., Peoria, IL (US)

(72) Inventors: Brian E. Lister, Edwards, IL (US); Bernard M. Murphy, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/677,818

(22) Filed: May 29, 2024

(65) Prior Publication Data

US 2025/0369512 A1 Dec. 4, 2025

(51) Int. Cl.

| F16H 61/16 | (2006.01) |
| F16H 59/14 | (2006.01) |
| F16H 59/34 | (2006.01) |
| F16H 59/46 | (2006.01) |
| F16H 59/70 | (2006.01) |
| F16H 59/78 | (2006.01) |
| F16H 59/36 | (2006.01) |

(Continued)

(52) U.S. Cl.
CPC ............ *F16H 61/16* (2013.01); *F16H 59/14* (2013.01); *F16H 59/34* (2013.01); *F16H 59/46* (2013.01); *F16H 59/70* (2013.01); *F16H 59/78* (2013.01); *F16H 2059/147* (2013.01); *F16H 2059/148* (2013.01); *F16H 2059/366* (2013.01); *F16H 2059/6815* (2013.01); *F16H 2059/743* (2013.01); *F16H 2059/746* (2013.01); *F16H 2061/166* (2013.01)

(58) Field of Classification Search
CPC .......... F16H 59/14; F16H 59/34; F16H 59/46; F16H 59/70; F16H 59/78; F16H 2059/147; F16H 2059/148; F16H 2059/366; F16H 2059/6815; F16H 2059/743; F16H 2059/746; F16H 61/16; F16H 2061/166

See application file for complete search history.

(56) References Cited

U.S. PATENT DOCUMENTS

| 5,588,936 A * | 12/1996 | Uchida ............... F16H 61/0213 |
| | | 477/155 |
| 5,738,605 A | 4/1998 | Fliearman et al. |
| 5,841,201 A | 11/1998 | Tabata et al. |

(Continued)

FOREIGN PATENT DOCUMENTS

| CN | 106660557 A * | 5/2017 | ............. F16H 59/66 |
| CN | 112594370 A | 4/2021 | |

(Continued)

OTHER PUBLICATIONS

Written Opinion and International Search Report for Int'l. Patent Appln. No. PCT/US2025/028648, mailed Jul. 16, 2025 (06 pgs).

*Primary Examiner* — Edwin A Young
(74) *Attorney, Agent, or Firm* — Leydig, Voit & Mayer, LTD.

(57) ABSTRACT

A transmission associated with a powertrain receives torque from a power source and includes a plurality of gear sets that can be selectively engaged and released. To shift gear sets, a shifting process conducted by an electronic controller may estimate a torque assist capacity of the power source to provide or accommodate changes in torque during the gear shift. If the torque assist capacity is less than a gear shift torque value, the shifting process prevents or ignores the gear shift.

20 Claims, 3 Drawing Sheets

(51) Int. Cl.
    *F16H 59/68*     (2006.01)
    *F16H 59/74*     (2006.01)

(56)     References Cited

U.S. PATENT DOCUMENTS

| | | |
|---|---|---|
| 6,216,074 B1 | 4/2001 | Hillman et al. |
| 7,261,670 B2 | 8/2007 | Endo et al. |
| 7,574,906 B2 | 8/2009 | Dourra et al. |
| 7,699,750 B2 | 4/2010 | Mertinkat et al. |
| 8,221,285 B2 | 7/2012 | Heap et al. |
| 8,414,449 B2 | 4/2013 | Heap et al. |
| 8,874,295 B2 | 10/2014 | Terakawa et al. |
| 8,950,561 B2 | 2/2015 | Lister et al. |
| 9,216,734 B2 | 12/2015 | Tsuda et al. |
| 10,190,645 B2 | 1/2019 | Lister |
| 2012/0158264 A1 | 6/2012 | Kuras et al. |
| 2023/0119802 A1 | 4/2023 | Park et al. |
| 2024/0125381 A1 | 4/2024 | Lister et al. |

FOREIGN PATENT DOCUMENTS

| | | | | |
|---|---|---|---|---|
| DE | 19622023 A1 | * | 12/1996 | ......... F16H 61/0213 |
| JP | 2015220970 A | * | 12/2015 | |

* cited by examiner

GEAR SHIFTING PROCESS FOR POWERTRAIN TRANSMISSION

TECHNICAL FIELD

This patent disclosure relates generally to a powertrain for producing and transmitting a motive force in a mobile machine and more specifically to actuating clutches in the transmission of the powertrain for engaging or disengaging rotating elements.

BACKGROUND

Mobile machines such as those used in construction, mining, or agriculture will include a powertrain that transmits the motive power embodied as rotational motion and torque that is generated by a power source to the point of utilization, referred to as the final drive, for example, wheels or continuous tracks for propelling the mobile machine. The powertrain itself includes components such as rotating shafts, a transmission, and differentials to adjust and redirect the motive power. For example, the transmission is configured to adjust and change the torque and speed characteristics of the motive power being transmitted through the powertrain. A conventional transmission may include a plurality of gear sets that can be selectively engaged in different ratios to increase or decrease the rotational speed and, in an inverse relation, the torque. Each individual gear set can provide a fixed range of torque and speed, and selectively engaging individual gear sets while disengaging others enables the mobile machine to operate in a variety of different torques and speed ranges.

To enable the selective engagement and disengagement of the gear sets, the transmission can include one or more clutches that can operatively connect or release rotating components such as shafts or gears that are moving relative to each other. For example, the actual gear pairs or sets can be associated with either drive shafts or driven shafts, and the clutches may lock or release the gears with respect to the shafts thereby engaging or disengaging the gear sets.

A common example of a clutch is a hydraulic clutch that utilizes pressurized hydraulic fluid to move the rotating components together and apart. The hydraulic clutch can include a plurality of adjacent disc-shaped clutch plates that can be moved into and out of contact with each other. When the clutch plates abut each other in frictional contact, rotation applied to one set of clutch plates is transferred to the other set of clutch plates. To move the clutch plates into and out of contact, the hydraulic clutch can include a clutch actuator that receives or discharges pressurized hydraulic fluid that moveably displaces a piston whose motion is transferred to the clutch plates.

Because the rotating elements may be rotating at different speeds prior to engagement, it may be necessary to change the rotational speeds of the components at the time the hydraulic clutch is engaged. For example, when shifting between the two different gear sets, the clutch associated with the gear set being engaged may be designated the oncoming clutch and the clutch associated with the disengaging gear set may be designated the off-going clutch. If the speed difference between oncoming and off-going elements is too great, the speed difference may cause the clutch plates to slip with respect to each other. Abrasive slipping of the clutch plates generates heat and causes wear, and may possibly damage the hydraulic clutch. The present disclosure is therefore directed to operating a transmission to reduce the possibility of hydraulic clutches slipping during a gear shift.

SUMMARY

The disclosure describes, in one aspect, the disclosure describes a method of operating of operating a transmission in a powertrain. The method is initiated when a gear shift in the transmission is detected. The method estimates a torque assist capacity associated with a power source connected to direct torque to the transmission. The method also determines a gear shift torque value associated with the gear shift as detected. The torque assist capacity and the gear shift torque value are compared. If the torque assist capacity complies with the gear shift torque value, the method completes the gear shift as detected.

In another aspect, the disclosure describes a powertrain for a mobile machine with a transmission including a plurality of gear sets associated with clutches for selectively engagement and release in response to a gear shift. The transmission is connected to and receives torque from a power source. An electronic controller is configured to detect the gear shift, estimate a torque assist capacity of the power source, determine a gear shift torque value, and compare the torque assist capacity and gear shift torque value in order to conduct the gear shift.

DETAILED DESCRIPTION

Figure 1:
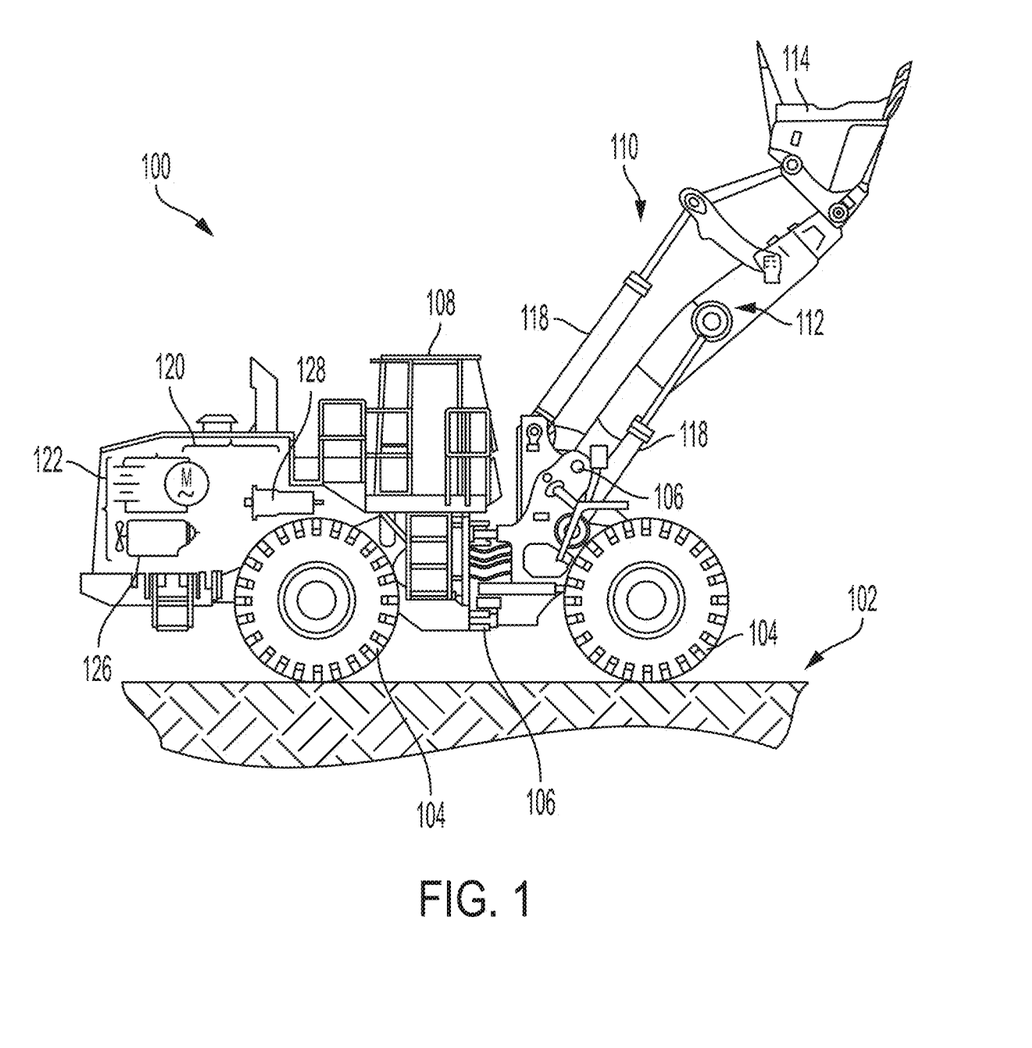
FIG. 1 is a side elevational view of a mobile machine such as a wheel loader having a powertrain including a power source operatively connected to a propulsion device through a transmission.

Now referring to the drawings, wherein whenever possible like reference numbers will refer to like elements, there is illustrated in FIG. 1 an example of a machine 100 and, in particular, a mobile machine embodied as a wheel loader for moving or loading materials such as rock, soil, or debris. While the illustrated mobile machine 100 is a wheel loader, in accordance with the disclosure the mobile machine can be any type of machine that performs some operation associated with an industry such as mining, construction, landscaping, agriculture, transportation, or any other industry known in the art. Examples of mobile machines 100 include dozers, excavators, dump trucks, haul trucks, motor graders, material handlers or the like.

To travel over the terrain surface 102 at a worksite, the mobile machine 100 includes a plurality of propulsion devices 104 that are rotatably connected to a machine frame 106 formed of rigid structural steel castings and beams arranged to carry the forces and loads applied to the mobile machine during operation. The propulsion devices 104 contact and can roll with respect to the terrain surface 102 thereby propelling the machine frame 106. Examples of suitable propulsion devices 104 include pneumatic wheels connected to the machine frame 106 by bearings or continuous tracks that can be caused to translate with respect to the machine frame by drive sprockets.

To accommodate an operator, an elevated cab or operator station 108 can be supported on the machine frame 106 in a position to provide visibility over the terrain surface 102. The operator station 108 can also accommodate various control devices and gauges for operating the mobile machine 100 such as steering wheels or joysticks, gears sticks, speedometers, and the like. In other embodiments, the mobile machine 100 can be configured for remote operation or autonomous or semi-autonomous operation.

To conduct operations at the worksite, the mobile machine 100 can be associated with a work implement such as a loading mechanism 110 for loading and dumping material with respect to the terrain surface 102. The loading mechanism 110 can include one or more elongated lift arms 112 that are pivotally coupled to the machine frame 106 at a proximal end and connected at the other distal end to a bucket 114 to accommodate material. To pivotally move the lift arms 114 and raise and lower the loading mechanism 110 with respect to the terrain surface 102, the loading mechanism can be operatively associated with one or more hydraulic actuators 118 such as hydraulic cylinders that can telescopically extend and retract by activation of pressurized hydraulic fluid. Examples of other suitable work implements that may be used on the mobile machine 100 for different tasks include compactors, fork lifting devices, brushes, grapples, cutters, shears, blades, breakers/hammers, augers, and others implements.

To generate and distribute motive power to the propulsion devices 104 and loading mechanism 110, the mobile machine 100 includes a powertrain 120 supported on the machine frame 106. The powertrain 120 includes a power source 122 that creates and provides the motive power for distribution to the points of utilization. In an example, the power source 122 can be an electrical supply system 124 that utilizes energy in the form of electrical power. A typically example of an electrical supply system 124 can be an electric battery that conducts a chemical reaction to generate electrical power which is converted by an electric motor to motive power embodied as torque and rotational speed. In another example, the power source 122 can be an internal combustion engine 126 that combusts a hydrocarbon-based fuel and converts the chemical energy therein to mechanical power including torque and rotational speed that can be transmitted and utilized by the powertrain 120 for different applications. Another example of a power source 122 includes a diesel-generator that utilizes an internal combustion engine to operate an electric generator to produce electrical power for application.

The motive force generated by either embodiment of the power source 122 typically must be modified for utilization at the point of application such as the propulsion devices 104. Accordingly, the powertrain 120 can include a transmission 128 disposed between and operatively connected to the power source 122 and the propulsion devices 104. The transmission 128 may be a mechanical transmission that includes a plurality of internal engageable gear sets that can adjust the rotational speed input from the power source 122, measured in RPMs for example, and in an inverse relation change the torque, measured in foot-pounds for example. The transmission 128 may be a fixed gear transmission with gears selectively engageable in fixed gear ratios that change the input to output ratios of rotational speed and torque. The transmission 128 could also be a continuously variable transmission (CVT) that can be modified over continuous ranges of rotational speed and torque rather than in the discrete ranges associated with fixed gear ratios. In the example of a CVT, the transmission 128 can be associated with a plurality of distinct selectable virtual gear ratios that mimic the traditional fixed gear transmissions for operator convenience and familiarity. Other examples of transmissions 128 include hydrostatic transmissions that incorporate hydrostatic components such as a hydraulic pump and an associated motor, and other suitable components that utilize fluid pressure and power.

Figure 2:
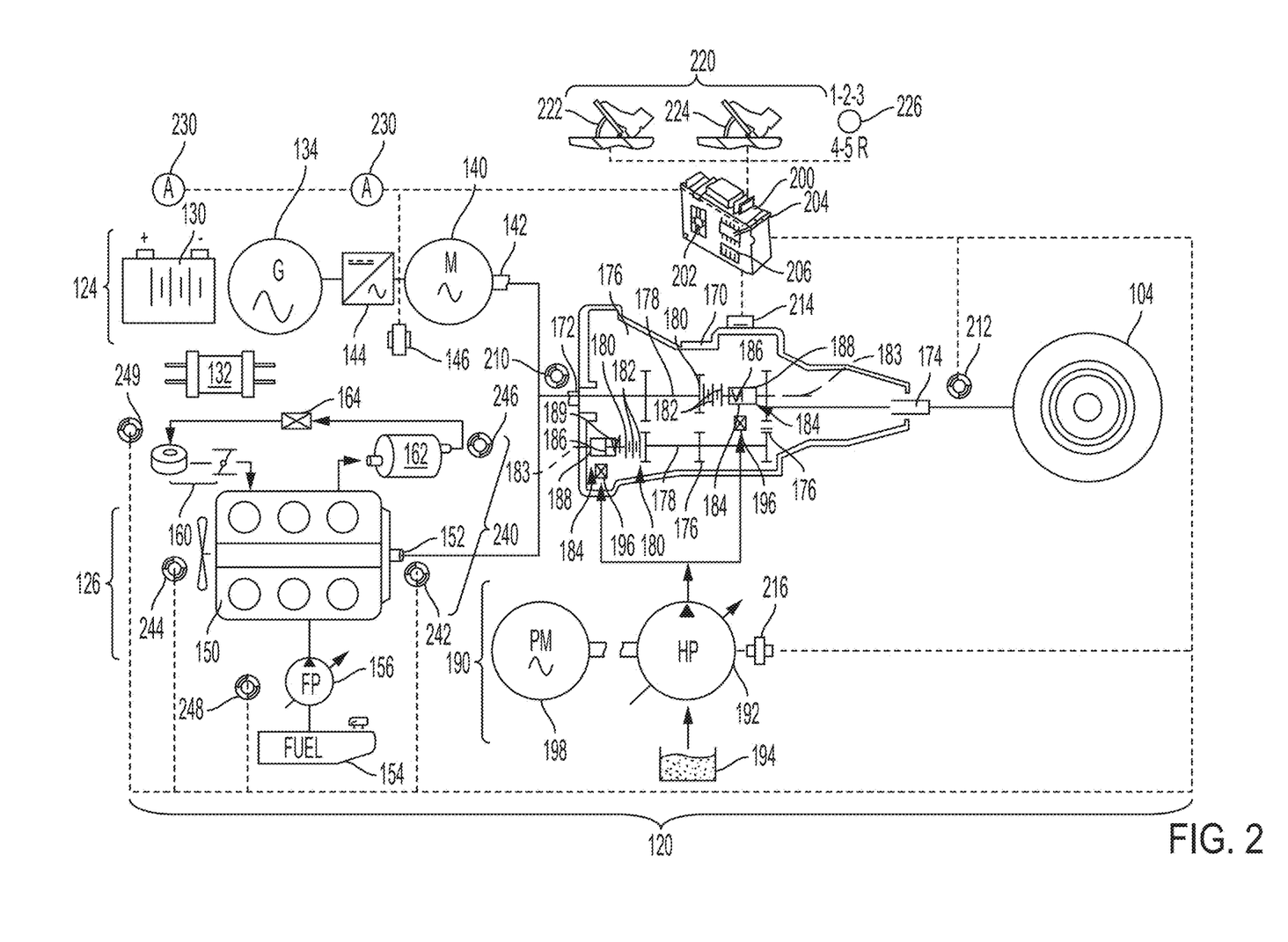
FIG. 2 is a schematic representation of the transmission including a plurality of selectively engaged gear sets to adjust the torque and rotational speed transferred from the power source to the propulsion devices.

Referring to FIG. 2, there is illustrated a schematic diagram showing in greater detail the powertrain 120 and associated components in operative arrangement. As indicated, when embodied as an electrical supply system 124, the power source 122 can include a rechargeable electric battery 130 that stores and discharges direct electric current through an electrochemical reaction. The rechargeable electric battery 130 can include a plurality of individual cells assembled from the positive and negative electrodes and the electrolyte arranged to conduct the electrochemical reaction when electrically connected in a closed circuit with a load. The rechargeable battery 132 can be periodically recharged from an external power source such as the electrical grid. In another example, the electrical supply source 124 can be a fuel cell 132 that generates electricity by converting the chemical energy of a fuel such as hydrogen into electrical energy. In contrast to a rechargeable battery 132, the fuel of a fuel cell 132 must be periodically replenished.

In another configuration, the electrical power source 122 can be an electrical generator 134, which is similar to an electric motor and has an electromagnetic assembly that converts motive power into electrical power in the form of alternating electric current. Specifically, the electrical generator 134 is an electromagnetic assembly in which permanent magnets or conductive field windings create a magnetic field and are rotated with respect to induction windings in which an electric current is generated. The electrical generator 132 can be operatively coupled to an internal combustion engine for relative rotation of the windings and magnets.

To convert the electricity from the electrical supply system 124 to the rotational torque, the powertrain 120 can include one or more electric motors, which when operatively connected with the propulsion devices 104 can be referred to as traction motors 140. The traction motor 140 may be an electromagnetic assembly in which the electric current is directed through conductive windings to generate a rotating magnetic field. The magnetic field can attract permanent magnets or magnetic materials disposed on a rotor causing rotation of the rotor as it follows the rotation of the magnetic field. The resulting rotational motion is output from a motor shaft 142 protruding from the traction motor 140.

Operation of the traction motor 140, including the speed range and the associated torque, can be a function of the characteristics of the electrical power from the electrical supply system 124. For example, the traction motor 140 can be configured to utilize alternating electrical current and the operating motor speed output via the rotating motor shaft 142 can be determined by the frequency of the alternating current. If the electrical supply system 124 supplies direct current, as is the case with a rechargeable battery 130 or fuel cell 132, the traction motor 140 can be operatively connected through a power converter 144 that converts between direct current and alternating current to match the electrical polarity of the electrical supply system 124 to the traction motor 140.

The traction motor 140 may be a variable speed motor and can be associated with a motor controller 146 that adjusts its operation. For example, the motor controller 146 can regulate the frequency and/or current supplied to the traction motor 140 and thus controls the rotational speed and torque delivered through the rotating motor shaft 142. The motor controller 146 can be part of a feedback circuit to actively and responsively adjust the operation the traction motor 140. The traction motor 140 can be associated with other electrical devices such as voltage convertors, transformers, etc., to further adjust the electrical power from the power source 122. Electrical communication between the power source 122 and traction motor 140 can be established by conductive wires, power cables, or the like.

When embodied as an internal combustion engine 126, the power source 122 includes an engine block 150 that defines the cylinders containing the reciprocal pistons in which the combustion process occurs and the airflow and exhaust passages and manifolds for the flow of gasses. The engine block 150 can also accommodate fuel injectors to introduce fuel to the cylinders. Combustion of air and fuel displaces the reciprocal pistons which rotates a crankshaft 152 that protrudes from the engine block 150 and that is operatively connected with the powertrain 120.

To supply fuel for combustion, the internal combustion engine 126 is associated with a fuel system including a fuel reservoir 154 or fuel tank and a fuel pump 156 that pressurizes and directs fuel to the engine block 150. The fuel can be a fluid liquid such as diesel or gasoline, although another fuel source can be pressurize or liquidized natural gas. To provide air for combustion, the internal combustion engine 126 can be associated with an air intake system 160 that may include air filters, throttles, and the like. The air intake system 160 directs and controls the flowrate of air to the engine block 150 which in part determines and effects the combustion process and motive forces delivered through the crankshaft 152.

To discharge the combustion byproducts from the engine block 140, the internal combustion engine 126 can be associated with an exhaust system 162 that can include various catalytic converters, after treatment systems, diesel exhaust filters, and regeneration systems to modify the chemical composition of the exhaust gasses. In particular, the components and devices included in the exhaust system 162 are intended to reduce or alter the effect of exhaust emissions from the internal combustion engine 126.

In an embodiment, the exhaust system 160 can be associated with an exhaust gas recirculation (EGR) system 164 in which a portion of the exhaust gasses are diverted and recirculated to the air intake system 160. The presence of exhaust gasses displaces and reduces the quantity of oxygen in the combustion chamber, which results in limiting the formation of nitrogen oxides. The EGR system 164 can include an EGR valve that adjusts the flow of exhaust gasses back to the air intake system 160 and that can be operated in proportion to the engine speed of the internal combustion engine 126 to optimize the reduction in nitrogen oxides.

To physically connect of the transmission 126 with the power source 122 and the propulsion devices 104, the structural transmission housing 170 of the transmission includes a protruding input shaft 172 and an oppositely directed output shaft 174. For example, to receive the motive power produced as torque and rotational speed, the input shaft 172 can be fixedly coupled to the motor shaft 142 of the traction motor 140 or crankshaft 152 of the engine block 150. The input shaft 172 and the output shaft 174 are rotatably attached to the structural transmission housing 170 by bearings.

The transmission 126 may be a mechanical transmission in which the input shaft 172 and the output shaft 174 are interconnected through a plurality of internal engageable gear sets 176 accommodated within the structural transmission housing 170. The gear sets 176 can be selectively engaged and disengaged in various gear ratios thereby adjusting the rotational speed and torque output from the power source 122.

In an embodiment, the individual gears of the gear set 176 can be associated with corresponding gear shafts 178 supported within the structural transmission housing 170. Using a shifting dog collar or the like, the gears of the gear sets 176 can be locked into fixed rotation with the gear shafts 178 or rotationally released with respect to the shaft so the structures rotate independently. The selection of engaged and disengaged gear sets 176 and gear shafts 178 determines the adjustment to rotational speed and torque between the transmission input shaft 172 and transmission output shaft 174.

As will be appreciated by those of skill in the art, changing rotational speed, measured in RPMs for example, results in an inverse change in the torque, measured in foot-pounds for example. The individual gears of the gear sets 176 may have different diameters and different numbers of gear teeth protruding about their diameter. The diameters and tooth number can be such that when two different gears are intermeshed together, they will rotate at different rotational speeds.

The transmission 128 can be configured with any suitable number of predetermined or fixed gear sets 176 that represent the different speed ratios of the adjusted rotational speed between a transmission input shaft 172 and the rotational speed at a transmission output shaft 174. The transmission 128 can also be arranged to reverse the rotational motion to, for example, drive the mobile machine 100 in forward or reverse. It should be noted that while the disclosed embodiment of the transmission 128 is a mechanical transmission with discrete gear ratios, aspects of the disclosure can apply to continuously variable transmissions, hydrostatic transmissions, transmissions utilizing planetary gears, etc.

To selectively engage and disengage the plurality of gear sets 176, the transmission 128 may include one or more clutches 180. The clutches 180, for example, can be arranged to lock or release the gear sets 176 and gear shafts 178 into or out of fixed rotation, thereby determining the engaged gear set that adjusts the torque and speed ratios between the transmission input shaft 172 and the transmission output shaft 174. The clutches 180 can also be arranged to disconnect the transmission input shaft 172 and the transmission output shaft 174 and place the transmission 128 in a neutral configuration so that torque or rotational power cannot be transmitted there through. The neutral state may allow reconfiguration of the engaged gear sets 176 and gear shafts 178 without interference having to conduct or transmit motive power.

In an embodiment, the clutch 180 can be a multidisc clutch having a plurality of clutch disks 182 that are planar circular shaped disks combined in a parallel arrangement to provide a clutch pack. For example, the clutch disks 182 can be aligned in an axial relation to a clutch axis 183. A first set of clutch disks 182 fixed to a clutch shaft aligned with the clutch axis 183 and a second set of clutch disks fixed to a clutch basket that surrounds the clutch pack.

When the clutch disks 182 are axially moved into an abutting frictional contact, the rotational motion applied to a first set of the clutch disks 182 is transferred to the second set of disks. When the clutch plates 182 are axially moved apart, transfer of rotational motion between the clutch pack ceases. In other embodiments, the hydraulic clutch 160 can have other configurations such as a dual clutch having single plates that are accommodated in separate baskets that can be engaged and released to discontinue the transmission of motive power through the transmission 128.

To actuate axial movement of the clutch plates 182 with respect to the clutch axis 183, the clutch 180 is operatively associated with a hydraulic clutch actuator 184. The hydraulic clutch actuator 184 can be a hydraulic cylinder with a piston 186 that is moveable within a tubular cylinder body 188. The piston 184 slides axially in parallel to the clutch axis 183 and is fixed to a portion of the spaced apart clutch plates 182 so that axial movement of the piston 186 moves the totality of clutch plates 162 into and out of frictional contact.

To cause the piston 186 to move axially with respect to the clutch axis 183, pressurized hydraulic fluid can be introduced to or drained from the tubular cylinder body 188 on either side of the piston 186. Pressurizing the cylinder body 188 on one side of the piston 186 will axially displace the piston 186 toward the other axial end of the cylinder body 188, which may be at a reduced pressure by draining the hydraulic fluid therefrom. In an embodiment, to normally bias the clutch plates 182 out of fictional contact, a spring 189 can be placed in the cylinder body 188 urging the piston 186 in the desired axially direction along the clutch axis 183.

To provide the pressurized hydraulic fluid for operation, the transmission 128 is operatively associated with a hydraulic system 190. The hydraulic system 190 can include a hydraulic pump 192 and a fluid reservoir 194. The fluid reservoir 194 can be a vented or enclosed tank that accommodates the hydraulic fluid which the hydraulic pump 192 can pressurize and direct to the transmission 128 via conduits like flexible tubing or rigid pipes. The hydraulic fluid can be any suitable hydraulic fluid such as, for example, a mineral oil or a hydrocarbon-based fluid.

The hydraulic pump 192 can be any suitable type of mechanical fluid pump including, for example, a gear pump that can cause pressurized flow of a fluid and can be a variable speed or fixed speed pump. In an embodiment, the hydraulic pump 192 can be a variable displacement pump that can selectively adjust the hydraulic pressure and/or flowrate of the hydraulic fluid pumped there through. The hydraulic pump 192 may also supply pressurized hydraulic fluid for use by other systems on the mobile machine, such as the hydraulic actuators 118 included on the loading mechanism 110.

To regulate the flow of hydraulic fluid directed from the hydraulic pump 192 to the clutch actuators 184, the hydraulic system 180 can include one or more hydraulic valves 196. For example, the hydraulic valves 196 can be solenoid actuated control valves that can change the flowrate and flow direction of hydraulic fluid between the hydraulic pump 192 and the clutch actuators 184. An electromagnetic solenoid can be coupled to an internal spool that can be moved between different positions opening and closing various ports of the hydraulic valve 196 that sets the flow direction and flowrate of hydraulic fluid. The electromagnetic solenoid can be actuated by an applied electric current. Moreover, to vary the flowrate and/or hydraulic pressure, the hydraulic valve 196 can be responsive in proportion to the strength of the current applied to the valve solenoid.

To regulate and control coordinated operation of the transmission 128 including adjusting the input to output ratios, an electronic controller 200, also referred to as electronic control module (ECM) or an electronic control unit (ECU) is associated with the powertrain 120. The electronic controller 200 can include various circuitry components in any suitable computer architecture for receiving and processing data and software to operate. The electronic controller 200 can process and execute different functions, steps, routines, and instructions written as computer readable software programs and may use data from sources such as data tables, charts, data maps, lookup tables and the like. Additionally, the electronic controller 200 can be responsible for processing functions associated with various other systems on the mobile machine. While the electronic controller 200 is illustrated as a standalone device, its functions may be distributed among a plurality of distinct and separate components.

The electronic controller 200 can include one or more microprocessors 202 such as a central processing unit (CPU), an application specific integrated circuit (ASIC), or a field programmable gate array (FPGA) comprising a plurality of transistors and similar circuits that are capable of reading, manipulating and outputting data in electronic form. The processor 204 can include the appropriate arithmetic and control logic circuitry and associated registers for conducting digital logic operations.

The electronic controller 200 can include non-transient programmable memory 204 or other data storage capabilities that may be random access memory or more permanent non-volatile forms of data storage media. Common examples of computer-readable memory 204 include RAM, PROM, and EPROM, a FLASH-EPROM, and any other memory chip or cartridge. The memory 204 is capable of storing in software form the computer executable programs including instructions and the data that can be read and processed by the microprocessor 202. The software and data may take the form of instruction sets, rules, definitions, applications, routines, libraries, databases, lookup tables, data sets, and the like.

To communicate with other instruments and actuators associated with the electric powertrain 120, the electronic controller 200 can include various input/output ports 206 and related circuitry. Communication may be established by sending and receiving digital or analog electronic signals across electronic communication lines or communication busses using any suitable data communication protocols, including wireless protocols. The various communication and command channels are indicated in dashed lines for illustration purposes.

For example, to measure the operational settings and conditions of the transmission, the electronic controller 200 can be communicatively connected to one or more transmission sensors including a transmission input sensor 210 and a transmission output sensor 212. The transmission input and output sensors 210, 212 may be rotary encoders to read the rotational speeds of the transmission inputs and output shafts 172, 174 respectively. In an embodiment, the rotary encoders can directly measure the rotational motional and torque of the transmission input and output shafts 172, 174 through direct physical contact. In another embodiments, the transmission input and output sensors 210, 212 can be located in close proximity to the transmission input and output shafts 172, 174 and can indirectly measure the rotational speed using infrared or acoustic techniques.

Because the output shaft 174 of the transmission 128 is connected with the propulsion device 104, the readings made by the transmission output sensor 212 can indicate the travel speed or velocity generated by the powertrain 120 with respect to the terrain surface 102. Moreover, the readings made by the transmission output sensor 212 can be compared with travel data from other sources such as GPS to determine if the propulsion derives 104 may be slipping or spinning, indicating that the traction forces being applied are inappropriate for the terrain surface 102 and conditions.

To sense and adjust operation of the transmission 128, the electronic controller 200 can be communicatively connected with a transmission control unit 214 that may be mounted to the structural transmission housing 170. The transition control unit 214 can sense conditions and settings internally of the transmission 128, such as the actuation of the clutch actuators 184 that are indicative of the engagement of the gear sets 176 or the operational settings and fluid pressure or flowrate produced by the hydraulic valves 196. Under appropriate commands from the electronic controller 200, the transmission control unit 214 can send electrical signals to the valve solenoids thereby actuating the hydraulic valves 196 to engage or release the associated gear sets 176.

Because the hydraulic valves 196 in the transmission 128 are functionally associated with the hydraulic system 190, the electronic controller 200 can also communicate with a pump controller 216 coupled to the hydraulic pump 192. For example, if the hydraulic pump 192 is a variable displacement pump, the pump controller 216 can adjust the flowrate and pressure generated in response to commands from the electronic controller 200, which in turn may affect the actuation timing of the clutches 180.

To interact with an operator, the electronic controller 200 can also be communicatively connected with one or more operator input devices 220. The operator may use the operator input devices 220 to control the mobile machine 100 by adjusting the operation of the powertrain 120. In a common practice, the operator input devices 220 can be used to increase or decrease the travel velocity produced by the powertrain 120 or may adjust the traction forces applied through the propulsion devices 104.

An example of an operator input device 220 is a velocity control 222 that can be embodied as a depressible accelerator pedal. The operator can actuate the velocity control 222 to command the desired velocity of the mobile machine 100, which can be accomplished by adjusting the transmission 128. Another example of an operator input device 220 can be a brake pedal 224. Depressing the brake pedal 224 retards or prevents rotation of the propulsion device 104 thus slowing or stopping the velocity of the mobile machine 100. Braking of the propulsion devices 104 can be coordinated with the operational settings of the clutches 180 for efficiency and to avoid disrupting the transmission 128.

In an embodiment, the transmission 128 can be configured to automatically engage and disengage the different gear sets 176 to produce the desired torque and speed characteristics. For example, using various transmission components such as hydraulic actuators 184, hydraulic valves 196 and torque convertors, the transmission can automatically switch between different gear sets 176 to produce the desired output speed and torque at the transmission output shaft 174 based on the commands received through the operator input devices 220 In an embodiment, to provide the operator with more direct control, the transmission 128 can be an manual transmission and the operator input devices can include a gearshift or gear selector 226 that can be used to select a gear set 176 to engage and disengage all others. The operator input devices 220 can also change the travel direction of the mobile machine, for example, from forward to reverse by changing the settings of the transmission 128.

The electronic controller 200 can also receive data and information about the power source 122 including the electrical supply system 124 and/or the internal combustion engine 126. For example, one or more electrical sensors 230 can be included that measure electrical characteristics of the electrical supply system 124. The electrical sensors 230 can be battery sensors that measure the voltage, current, or charge level of the rechargeable battery 130. The characteristics and parameters measured by the electrical sensors 230 can be indicative of the electrical power the rechargeable battery 130 is able to provide and thus the quantity of motive force the powertrain 128 can generate. In addition to sensing functionality, the electrical sensors in some embodiments can also function as actuators to adjust operation of the corresponding components.

In addition, the electrical sensors 230 can measure the battery temperature or battery health that also effect the ability of the rechargeable battery 130 to supply electrical power. Battery health can indicate the ability of the rechargeable battery to repeatedly charge and discharge, which may vary over time.

The electrical sensor can measure other parameters of the electrical supply system that can affect its ability to effectively convert electrical power to motive forces including torque and rotational speed. For example, the electronic controller 200 can exchange data and commands with the motor controller 146 associated with the traction motor 140 to adjust its torque and speed characteristics. The motor controller 146 can change the current and/or frequency of the electricity directed to the traction motor 140 and can amplify or reduce those values to change the motor output as desired. The electronic controller 200 can also communicate with the power convertor 144 and can receive data regarding temperature and health status that effect its ability to change the current polarity.

Where the power source 122 includes an internal combustion engine 126, the electronic controller 200 can be associated with a plurality of engine sensors 240 that measure and send data and information about the engine operation. For example, the engine sensors 240 can include an engine speed sensor 242 that measures the operating speed of the internal combustion engine. The engine speed sensor 242 can be a rotary encoder or a similar device that is operatively associated with the crankshaft 152 to measure rotation in revolutions per minute. Another example of an engine sensor 240 can be an engine temperature sensor 244 to monitor the operating temperature of the internal combustion engine 126. The engine temperature sensor 244 can be mounted to the engine block 150 to directly measure the temperature or may be included in the exhaust system 162 to indirectly measure the operating temperature through the temperature of the exhaust gasses.

The engine sensors 240 can also include emissions sensors 246 that are disposed in the exhaust system 162 to measure parameters associated with the composition of the emission gasses. For example, the emissions sensors 246 can be NOx or CO2 sensors that measure the nitrogen oxide or carbon dioxide content of the exhaust gasses. The electronic controller 200 can use the information and data from the emissions sensors 246 to adjust operation of the internal combustion engine 126 and change the composition of the exhaust gasses discharged to the environment.

The engine sensors 240 can also be configured and arranged to measure parameters of the combustion reactants. For example, a fuel sensor 248 can be included with the fuel system to measure flowrate and fluid pressure generated by the fuel pump 156. The fuel sensor 248 can determine and possibly adjust the quantity of fuel introduced to the engine block 150 during combustion which determines the motive power transferred through the crankshaft 152. The fuel sensors 248 may also be chemical sensors that measures qualitative data about the fuel such as its combustibility, for example, to estimate the power produced by the combustion process.

The engine sensors 240 may also include a mass airflow sensors 249 that measures the volume and flowrate of air directed by the air intake system 160 to the engine block 150. The mass airflow sensor 249 can be used to adjust and balance the quantity of air and fuel introduced to the engine block 150 and combusted which determines the power produce by the internal combustion engine 126 and which effects the contents of the exhaust gasses discharged by the exhaust system 162.

INDUSTRIAL APPLICABILITY

Figure 3:
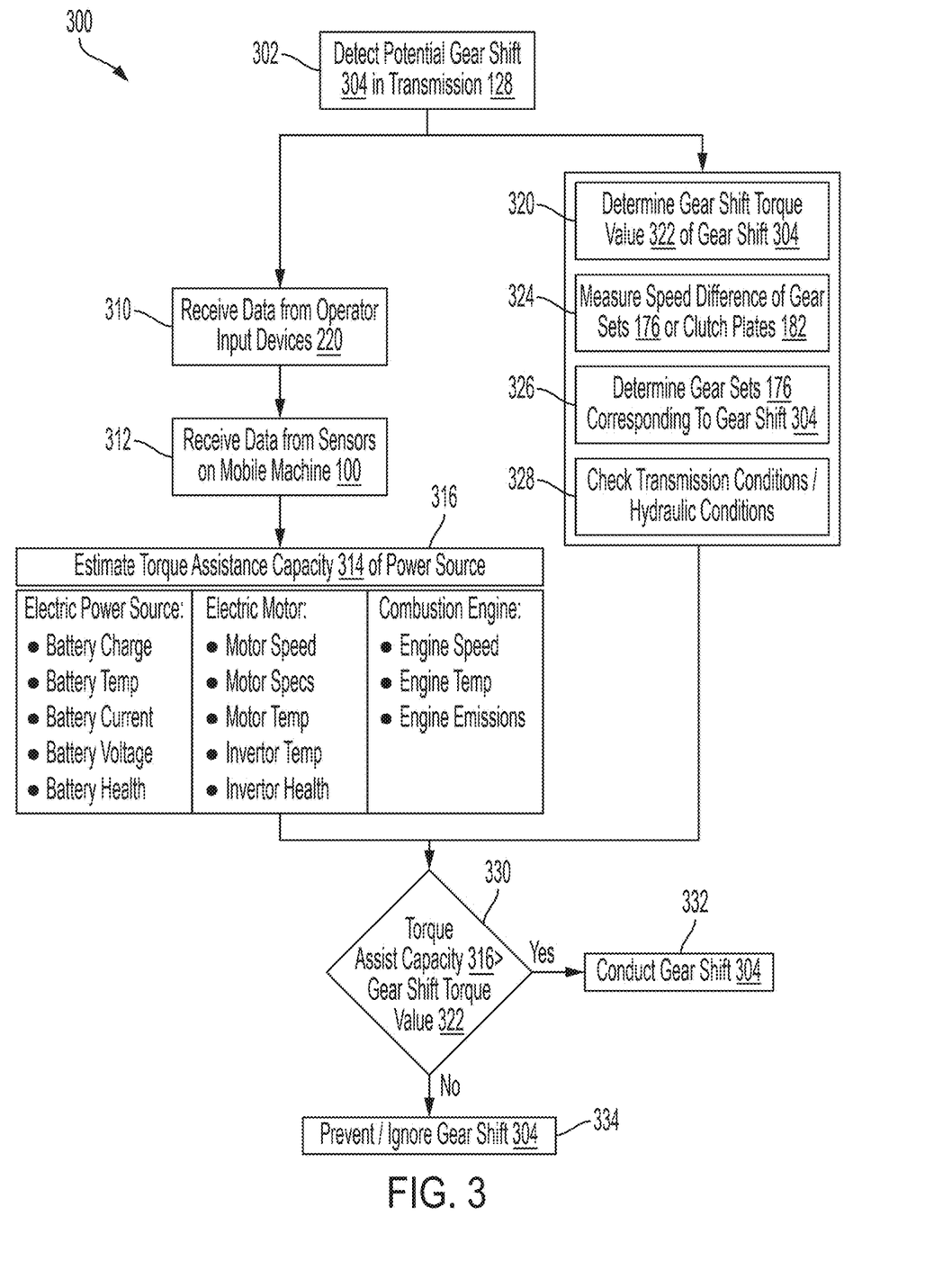
FIG. 3 is a flow diagram of a methodology for shifting gear sets in the transmission that may assess and utilize the motive power from the power source to assist shifting.

Referring to FIG. 3, with continued reference to the previous figures, there is illustrated an embodiment of a shifting process 300 that can be used for conducting gear shifts in which different gear sets 176 in the transmission 128 are engaged and disengaged. For example, when shifting gear sets 176 in a transmission 128, the gear set being engage can be referred to as the oncoming gears and the gear set being released can be referred to as the off-going gears. The clutches 180 associated with the oncoming and off-going gear sets, and specifically the spaced apart clutch plates 182, may initially be rotating at a different speeds. It is desirable to synchronize the rotational speeds before the clutch plates 182 are moved into frictional engagement and abutting contact, particularly in the oncoming clutch 180.

For example, the speed difference may result in the frictionally engaged clutch plates 182 slipping with respect to each other. Frictional abrasion between clutch plates 182 rotating at different speeds generates heat and also results in dissipation of the motive force transferred through the clutch 180. While the clutches 180 are designed to resist damage due to abrasion and to accommodate frictional heating, it remains desirable to reduce the speed difference and synchronize rotation speeds of the clutch plates 182 during gear shifts to improve operation and service life of the clutches 180.

To synchronize rotational speeds, the transmission 128 may utilize the motive forces produced by the power source 122, particularly the torque and rotational speed applied to the transmission input shaft 152. For example, if rotating speed of the oncoming gear set 176 and the associated clutch 180 should increase to match with the mating components, the transmission 128 may draw supplemental torque from the power source 122 that accelerates the oncoming gear set and clutch. Specifically, the supplemental torque provided from the power source is convert to acceleration increasing and synchronizing the speeds of the oncoming clutch plates 182, thereby reducing abrasive slip and heat creation.

In another example, the rotational speed of the oncoming gear set 176 and the associated clutch 180 should be reduced to synchronize with the mating components. In this example, as the oncoming clutch plates 182 frictionally contact, the rotational speed of the clutch assembly 160 being engaged is decelerated, resulting in a slowing of the transmission input shaft 172. Decelerating the rotational speed of the transmission input shaft 172 correspondingly directs torque back to the power source 122 that must be accommodated or dissipated. The condition of directing torque from the transmission 128 to the power source 122 can be referred to as retarding.

The shifting process 300 can determine the capacity of the power source 122 to provide or accommodate motive forces, and particularly torque, during gear shifts to assist shifting gear sets 176 within the transmission 128. The shifting process 300 can be initiated by a detection step 302 or operation that detects a gear shift 304 among the plurality of gear sets 176 in the transmission 128. By way of example, the gear shift 304 can occur in response to commands received from the plurality of operator input devices 220. In a manual transmission, an operator can use the gearshift 226 to direct shifting of the engaged gear sets 176. In an automatic transmission, the electronic controller 200 can detect that the gear shift 304 will occur indirectly in response to other conditions, such as commands from the velocity control 222 and/or brake pedal 224.

In response to detecting the gear shift 304, the electronic controller 200 can obtain or receive information via electronic data signals for processing to facilitate the gear shift. For example, in an input step 310 or operation, the electronic controller 200 can receive input from the operator input devices 220 that may indicate, explicitly or through analysis, the specific gear sets to be engaged and disengaged in the transmission 128.

The shifting process 300 can also include a data collection step 312 in which the electronic controller 200 collects or gathers data, embodied as electronic data signals from the plurality of sensors associated with the powertrain 120. The data collection step 312 can be conducted by sending data requests or read commands to the plurality of sensors. The electronic controller can also passively and continuously receive data and information from the plurality of sensors. The data collection step 312 can communicate with any of the foregoing sensors including the transmission sensors 210, 212, the electric sensors 230 associated with the electric supply system 124, and the engine sensors 240, and any of the other sensors.

Based on the data and information received, the electronic controller 200 can be programed to estimate the capability of the power source 122 to provide or accommodate torque, which can be referred to as the toque assist capacity 314. For example, in an estimation step 314, the electronic controller 200 can estimate the ability of the power source to produce and direct additional torque to the transmission 128 to accelerate the oncoming gear set 176 and associated clutch 180. The estimation step 316 may also estimate the ability of the power source 122 to receive and accommodate torque directed from the transmission 128, for example due to deceleration and counter moments applied to the transmission input shaft 172 when the rotational speed of the oncoming gear set 176 and associated clutch 180 must be reduced or retarded.

The estimation step 316 can analyze and process any combination of data from the data collection step 312 to estimate the toque assist capacity 314, For example, in the example of an electrical supply system 124, the data obtained by the electrical sensors 230 regarding the charge state, voltage, temperature, or output current of the rechargeable battery 130 can be indicative of the ability of the rechargeable battery to produce or store additional electrical power or charge exchanged between electrical supply system 124 and the transmission 128. In another example, the speed, temperature and specification ratings of the traction motor 140 can determine its ability to instantaneously increase the motive forces applied to the transmission input shaft 172. Conversely, the data may indicate the ability of the traction motor 140 to accommodate an increased load that is associated with the transmission directing a counter torque to reduce rotational speeds of the oncoming gear set 176 and clutch 180. In an embodiment, the torque assist capacity 314 can be based on traction motor heath status.

In another example, the torque assist capacity 314 can be based on the ability of the internal combustion engine 126 to provide or receive the torque from the transmission 128. For example, the estimation step 316 can process the engine speed and engine temperature determined by the engine sensors 240 to determine the capability of the internal combustion engine to quickly produce and transmit additional motive force to the torque input shaft 172. Conversely, the estimation step 316 can estimate the ability of the internal combustion engine to accommodate an increased load corresponding to the counter torque directed from the transmission 128 to reduce rotational speeds of the oncoming gear set 176 and clutch 180. The torque assist capacity 314 can account for emissions changes in the exhaust gasses that may resulting from producing or accommodating additional torque, which can be assessed in part by using the emissions sensor 246. In an embodiment, the torque assist capacity 314 can be based on engine heath status.

In another example, the torque assist capacity 314 can be based on the characteristics of the fuel system to produce more power in the internal combustion engine 126 through the combustion process. The torque assist capacity 314 can be based for example on the combustibility of the fuel which affects the torque produced by the internal combustion engine 126. The torque capacity can also be based on fuel pressure, fuel flowrate, and/or fuel system health status.

To determine if the torque assist capacity 316 of the power source 122 is sufficient to conduct the gear shift 304, the shifting process 300 can include a torque value determination 320. The torque value determination 320 can determine a gear shift torque value 322 that is associated with the gear shift 304 being conducted by the transmission 128. The gear shift torque value 322 can be related to the additional motive power required to accelerate or decelerate the oncoming gear set 176 and clutch 180 to synchronize the rotational speed with the mating components. The electronic controller 200 can base the gear shift torque value 322 on operating parameters or conditions of the transmission 128.

The torque valve determination 320 can be a quantitative calculation that computes the gear shift torque value 322 from the operating parameters or conditions. The torque valve determination 320 can also be a qualitative assessment that estimates the gear shift torque value 322 based on the operating parameters or conditions. For example, the torque valve determination 320 characterizes the shift torque value 332 based on the gear sets 176 being engaged or the type of gear shift 304 detected. In another example, the gear shift torque value 322 can be an arbitrary number determined empirically.

For example, in a speed measurement step 324, the electronic controller 200 can measure the relative rotational speeds of the clutch plates 182 of the oncoming clutch 180, which indicates the acceleration or deceleration that the torque assist capacity 316 of the power source 122 should provide. The electronic controller 200 can be programmed with algorithms, formulas, and data to calculate and convert the relative speed difference of the clutch 180 to the gear shift torque value 322.

In another example, the shifting process 300 can include a shift determination step 326 that can characterize the detected gear shift 304 by identifying the gear sets 176 that are engaging or releasing. The shift determination step 326 therefore determines the difference in gear ratios caused by the gear shift 304 which the electronic controller 200 can use to estimate the gear shift torque value 322. The gear shift torque value 322 can be calculated or may be determined empirically and stored based on the oncoming and off-going gear sets 176 identified by the shift determination step 326. In another example, the shift determination step 326 may characterize the gear shift 304 as an upshift or increase in gear ratios, thus increasing the rotational speed at the transmission output shaft 174, or a downshift or decrease reducing the rotational speed at the transmission output shaft.

In another example, the torque value determination 320 can base the gear shift torque value 322 on the operating conditions of the transmission 128 as provided by the transmission controller 214. For example, during a transmission check step 328, the transmission controller 214 can provide information about the temperature of the clutches 180 or the fluid pressure of the clutch actuators 184. Likewise, the temperature or pressure of the hydraulic fluid used to actuate the clutch actuators 184 can be provided by the pump controller 216 or other instruments and sensors associated with the hydraulic system 190.

In a comparison operation or step 330, configured as a decision operation, the shifting process 300 can compare the torque assist capacity 316 and the a gear shift torque value 322 to decide if the power source 122 can facilitate the detected gear shift 304. The comparison operation 330 can be conducted on any suitable quantitative or qualitative basis. If the comparison operation 330 decides that the torque assist capacity 316 meets or exceeds the gear shift torque value 322, indicating the power source 122 has sufficient capacity for the gear shift 304, the shifting process 300 can proceed to a shift operation 332 in which the gear sets 176 of the transmission 128 are shifted into engagement and released according to the detected gear shift 304.

If the electronic controller 200 determines the torque assist capacity 316 is insufficient for the gear shift torque value 322 via the comparison operation 330, the shifting process proceeds to a prevention step 334. In the prevention operation 334, the electronic controller 200 may prevent or ignore the detected gear shift 304. In an automatic transmission, the prevention operation 334 results in maintaining the present engagement of the gear sets 176. In a manual transmission, the prevention operation 334 may ignore the commands from the gear selector 226.

The prevention operation 334 can persist until such time that the electronic controller 200 determines that the power source 122 can provide a sufficient quantity of torque assist capacity 316 to facilitate the gear shift 304. Accordingly, the electronic controller 200 can continuously repeat the shift process 300 as a loop until the comparison operation 330 proceeds to the shift operation 332.

A possible advantage of the shift process 300 is that gear shifts 304 do not occur until the electronic controller determines the power source 122 has sufficient torque assist capacity 314 to assist the transmission 128. The shift process 300 thus reduces the oncoming clutch plates 182 from abrasively rotating with respect to each other due to rotational speed differences, or prevents the oncoming gear sets 176 from disruptively meshing until the relative speeds are synchronized.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of operating a transmission in a powertrain comprising:
   detecting a gear shift occurring with the transmission;
   estimating a torque assist capacity associated with a power source connected to direct torque to the transmission;
   determining a gear shift torque value associated with the gear shift as detected;
   comparing the torque assist capacity with the gear shift torque value; and
   conducting the gear shift if the torque assist capacity complies with the gear shift torque value.

2. The method of claim 1, wherein the power source is a rechargeable battery supplying electrical power to a traction motor.

3. The method of claim 2, wherein the torque assist capacity is estimated based on one or more of battery charge, battery temperature, battery current limits, battery voltage, and battery health.

4. The method of claim 2, wherein the torque assist capacity is estimated based on one or more of traction motor temperature, traction motor speed, traction motor specifications, and traction motor health.

5. The method of claim 2, wherein the power source includes a power convertor electrically connected between the rechargeable battery and the traction motor and the torque assist capacity is based on a convertor operating status including convertor temperature and convertor health.

6. The method of claim 1, wherein the power source is an internal combustion engine.

7. The method of claim 6, wherein the torque assist capacity is estimated based on one or more of engine speed, engine temperature, engine emissions, and engine health.

8. The method of claim 6, wherein the torque assist capacity is estimated based on one or more of fuel flowrate, fuel pressure, fuel system capacity, fuel combustibility, and fuel system health.

9. The method of claim 1, wherein the gear shift torque value is estimated based on a measured speed difference associated with an oncoming clutch.

10. The method of claim 1, wherein the gear shift torque value is estimated based on identification of an oncoming gear set.

11. The method of claim 1, wherein the determined gear shift torque value corresponds to increasing torque drawn from the power source to the transmission.

12. The method of claim 1, wherein the gear shift torque value corresponds to increasing torque directed from the transmission to the power source.

13. A powertrain for a mobile machine comprising:
    a transmission including a plurality of gear sets each associated with a clutch for selective engagement and release from engagement in response to a gear shift;
    a power source directing torque to the transmission;
    an electronic controller configured to detect the gear shift, estimate a torque assist capacity of the power source, determine a gear shift torque value, and compare the torque assist capacity and gear shift torque value in order to conduct the gear shift.

14. The powertrain of claim 13, wherein the power source is a rechargeable battery supplying electrical power to a traction motor.

15. The powertrain of claim 14, wherein the torque assist capacity is estimated based on one or more of battery charge, battery temperature, battery current limits, battery voltage, and battery health.

16. The powertrain of claim 14, wherein the torque assist capacity is estimated based on one or more of traction motor temperature, traction motor speed, traction motor specifications, and traction motor health.

17. The powertrain of claim 13, wherein the power source is an internal combustion engine and the torque assist capacity is based on one or more of engine speed, engine temperature, engine emissions, and engine health.

18. The powertrain of claim 13, wherein the power source is an internal combustion engine and the torque assist capacity is based on one or more of fuel flowrate, fuel pressure, fuel system capacity, fuel combustibility, and fuel system health.

19. The powertrain of claim 13, wherein the clutch includes a plurality of clutch plates and the gear shift torque value is determined based on a measured speed difference associated with an oncoming clutch.

20. The powertrain of claim 13, wherein the gear shift torque value is identification of an oncoming gear set.

* * * * *